Figure 1:
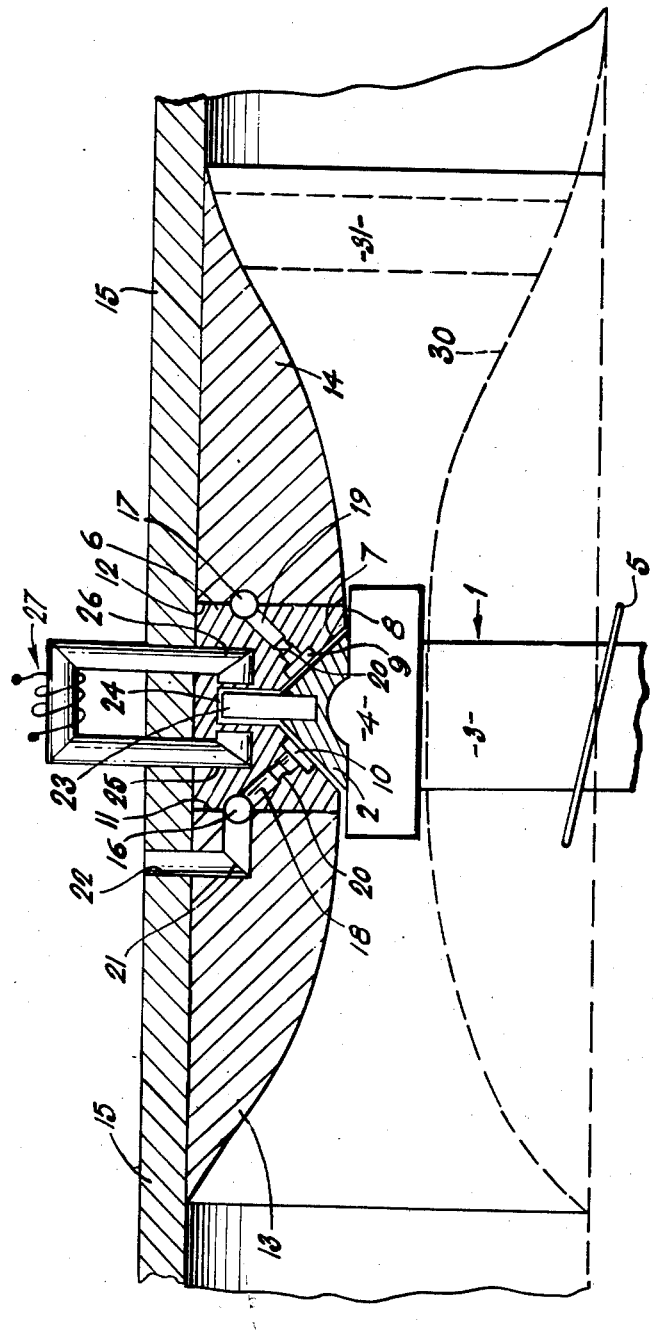

Feb. 18, 1964    W. H. P. LESLIE ETAL    3,121,330
HYDRAULIC FLOWMETERS
Filed March 6, 1961    3 Sheets-Sheet 3

INVENTORS
William Henderson Paterson Leslie
Thomas Ralston
BY
Larson and Taylor 3,121,330
HYDRAULIC FLOWMETERS
William H. P. Leslie and Thomas Ralston, East Kilbride, Glasgow, Scotland, assignors to National Research Development Corporation, London, England, a British corporation
Filed Mar. 6, 1961, Ser. No. 93,665
Claims priority, application Great Britain Mar. 8, 1960
13 Claims. (Cl. 73—231)

This invention relates to hydraulic flowmeters of the rotary type as distinct from the static type exemplified, say by venturi meters.

A known meter of the rotary type has a rotor which is mounted on conventional bearings fixed in a pipe, so that the axis of the rotor extends in the direction of flow of the fluid whose flow is to be measured. The rotor carries a number of radial propeller-like blades, the speed at which the rotor spins affording an indication of the rate of flow of the fluid. Hitherto a flowmeter of this rotary type has had certain disadvantages. First, the friction of the bearings varies with the speed of rotation and errors are introduced unless each meter is individually calibrated. Secondly, the bearings wear rapidly due to their submerged condition (unless elaborate and expensive measures are taken), necessitating frequent servicing and calibration of the meter. Thirdly, two bearings are required, one at each end of the axis of the rotor, to ensure that the rotor remains properly aligned, and the support for the leading or upstream bearing causes turbulence of the fluid before the fluid reaches the blades of the rotor. Hence inaccurate readings may be obtained. Fourthly, the use of two bearings makes it difficult to position the blades accurately with respect to fixedly located means for detecting rotation of the rotor. If the rotors are produced by a moulding process, each rotor will be identical and individual calibration will not be required.

The present invention aims at reducing or eliminating these disadvantages by mounting the blades on an annular rotor which is carried by a circumferential low-friction bearing. This bearing is preferably of the fluid pressure suported kind, and may be constituted by a rib on the rotor running in a complementarily shaped groove in a stator, the groove having recesses regularly spaced around its walls to which fluid is fed under pressure so that the rib is centred in the groove both radially and axially by a continuous film or layer of fluid which supports the rotor under both axial and radial loadings.

The above arrangement of rib and groove may be inverted, the rib being formed on the stator and carrying the fluid recesses instead of the groove.

It is another object of the invention to provide a stator which is constituted by, or mounted within, a pipe or duct whose internal wall on either side of the rotor is contoured to promote streamline flow through the rotor. The contour may be formed on separate pieces which serve to clamp the stator in position in the pipe or duct.

Figure 2:
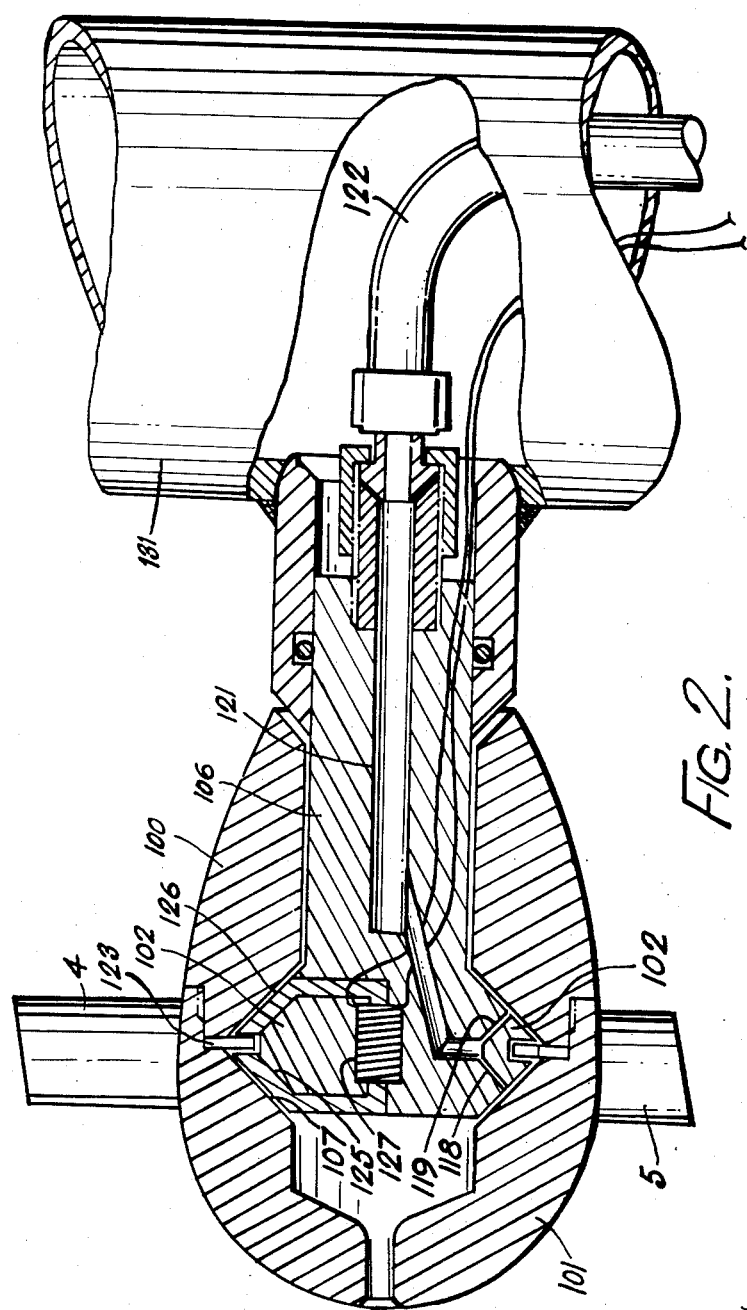
Figure 3:
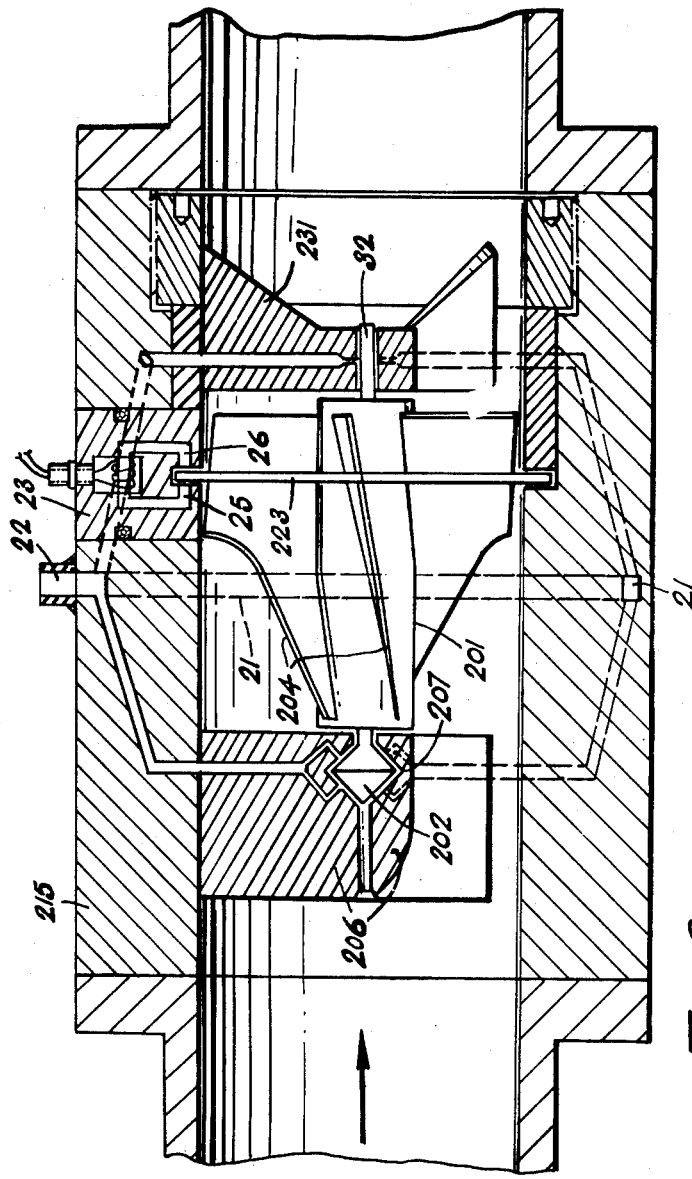

Practical constructions of rotary flowmeter according to the present invention will now be particularly described, by way of example only, with reference to the accompanying drawings in which FIGURES 1, 2 and 3 are longitudinal sections through three different embodiments of the invention.

Referring first to FIG. 1, which shows one half of a meter (the other half being identical), the flowmeter includes an annular rotor 1 the periphery of which is formed as a rib 2, V-shaped in section, and the inner face 3 of which is cylindrical. Mounted on the inner face 3 of the rotor are a number of blades, two of which are indicated at 4 and 5. Each blade extends inwardly from the inner face 3 but the plane of the blade is oblique to the axis of the rotor 1. The rotor is located by an annular bearing block or stator 6 of nonmagnetic material which is co-axial with the rotor 1 and which has a V-shaped bearing groove 7 in its inner face 8. The groove 7 is of complementary form to the V-shaped rib 2 of the rotor 1 and is dimensioned so that the rotor fits, with a little play, in the groove 7. The stator 6 will, of course be suitably divided to enable the rib 2 to be inserted. The bearing groove 7 has a plurality of pairs of recesses formed in the walls thereof equidistantly around the stator 6, the recesses of each pair being opposite each other as shown at 9 and 10. There are at least three pairs of recesses positioned 120° apart.

The bearing block or stator 6 is clamped between radial faces 11 and 12 of two annular streamlining pieces 13 and 14 so that the side faces of the stator abut the faces 11 and 12. The peripheries of the streamlining pieces 13, 14 and of the stator 6 are co-axial and are of the same diameter so that they form a cylindrical unit which can be fitted into a pipe 15. The side faces of the streamlining pieces 13 and 14 and the side faces of the stator have registering annular grooves which form two circulating ducts 16 and 17. Each recess 9, 10 in the bearing groove 7 is connected by a bore 18, 19 to a respective circulating duct. At the end of each bore adjacent the respective recess is a restriction 20. Each circulating duct has a supply passage (such as that shown at 21) which is formed in the associated streamlining piece, and registers with a port 22 by which fluid can be fed from the exterior of the unit to the circulating duct.

The periphery of the rotor 1 has a ring of radial projections or teeth 23 of magnetic material which run in a slot 24 formed at the bottom of the bearing groove 7. The poles 25 and 26 of a U-shaped magnet core are located in the stator 6 so that there is one on either side of the slot 24. The core has an output signal winding 27. In an alternative construction (not shown) where the rotor 1 is of non-magnetic material, each tooth 23 may be constituted by a magnetic insert embedded in the rotor—for example it may be a triangular plate whose side edges conform to the contour of the cross-section of the rib 2.

In operation, fluid under pressure is fed by the supply passages to the circulating ducts 16 and 17 and reaches the recesses 9 and 10 in the bearing groove 7, and escapes from the recesses between the walls of the bearing groove 7 and the rib 2 around the rotor. Escaping fluid which tends to collect in the slot 24 is drawn off by an exhaust duct (not shown). Due to the action of the restrictions 20 in the bores 18, 19 the pressure in a recess 9 or 10 depends on the rate of escape of fluid from it, and this in turn depends on the clearance between the walls and the rib 2, and hence on the position of the rotor 1. Should the rotor (as seen in the drawing) rise, the pressure in both the recesses 9 and 10 will rise whereas the pressure in the recesses on the opposite side of the rotor will decrease. Hence, the rotor will experience a resultant downward force tending to restore it to its proper, equilibrium, position. Should the rotor (as seen in the drawing) tend to move to the right the pressure in recess 9 will rise whereas that in recess 10 will fall. The rotor is therefore centralised by the pressure fluid which acts as a bearing medium. For accurate pressure balancing, the restrictions 20 may be made adjustable.

The source from which the lubricating fluid under pressure is supplied to the recesses 9, 10 is immaterial provided that the fluid is well filtered and that its pressure in the ducts 18 and 19 remains reasonably constant. A pump may be used to supply the fluid from an external source but preferably from the fluid whose rate is to be measured. Under certain conditions, a restriction could be provided upstream from the blades from which pressure fluid could be bled to the recesses without the need for a pump.

As the rotor 1 revolves, the magnetic projections or teeth 23 pass between the poles 25 and 26 and in doing so produce pulses in the pick-up output winding 27. The pulses are counted or integrated to give an indication of total flow. To determine rate of flow, the frequency of the pulses is measured—for example by counting pulses over a short fixed period or in some other convenient way. Instead of using magnetic induction to measure the speed of rotation of the rotor 1, variation of capacitance or the interruption of a light beam by a projection on the rotor may be used.

The sensing of the rotation of the rotor may be effected by a magnetic pick-up wholly located within the block 6 so that only electrical leads need be attached to it. By the provision of a multiplicity of magnetic teeth and two or more magnetic pick-ups spaced by a different pitch from that of the teeth, a poly-phase output can be obtained from which the direction of rotation can be determined.

The velocity of water flowing in a pipe varies across the diameter of the pipe, the velocity being highest at the centre and lowest at the wall of the pipe. Thus, if the blades 4, 5 are to extend inwardly by an amount which is a significant proportion of the diameter of the pipe (because the velocity of the fluid is low), the angle of attack of each blade must be varied across the diameter of the pipe in the manner of a propeller. It is expensive to manufacture such blades, but this difficulty can be obviated in the present meter by mounting a streamlined core or restricting piece 30 within the rotor 1. The core is carried on a radial spider or arms 31 fixed on the downstream streamlining piece 14. The core 30 produces, in combination with the pieces 13 and 14, an annular venturi in which the blades 4, 5 rotate. By careful selection of the dimensions of this annulus, straight blades 4, 5 can be used.

Instead of a continuous annulus 6 forming the stator, the streamlining pieces 13, 14 may be constituted by a unitary component having a plurality—say, three—of radial holes into which are inserted generally cylindrical plugs each having the cross-section shown at 6 in FIG. 1 of the drawings. This has the advantage that the plugs can be individually withdrawn, cleaned and replaced without completely dismantling the meter. The pipe 15 may also be omitted and the resultant unit used as a probe in a large pipe.

The rotor has been described as an annulus the outer periphery of which carries a rib 2 which constitutes a journal whilst the inner periphery carries the blades 4. But it is envisaged that the rib 2 could be formed on the inner periphery whilst the outer periphery carried the blades. In this case a stator part mounted and shaped in the same way as the core 30 in the drawing would perform the same functions as the parts 6, 13 and 14. The pressure fluid circuit and electric conductors would then pass through the spider 31. An advantage of this arrangement is that more than one meter could be located across the section of a pipe. A typical construction is shown in FIG. 2.

FIGURE 2 shows a generally pear-shaped annular rotor 100 which has a ring of blades 4, 5 on its external surface. The rotor surrounds, with working clearance, a stator 106 in the form of a spigot welded on the leading edge of a probe mounting consisting of a streamlined tube 131. The rotor is supported radially and axially on a fluid film formed in a V-section groove 107 in the internal wall of the rotor 100 into which fits, with working clearance, a complementarily shaped rib 102 on the stator 106. Fluid under pressure is pumped through a pipe 122 within the streamlined mounting tube 131, and thence through an axial bore 121 in the stator spigot 106 to restricting ducts 118, 119 which open through the flanks of the rib 102. A magnetic pick-up 125, 126, 127 is embedded in the rib 102, its poles 125, 126 embracing with clearance a ring of teeth 123 locked in an annular gap between the main body of the rotor and a separable nose cap 101 on which the blades 4, 5 are mounted.

The modification shown in FIG. 3 is intended for use in small bore pipes. The rotor 201 is supported by a leading main bearing 202 in an upstream three-armed spider 206 and a trailing steady bearing 32 in a downstream spider 231. Both bearings are flooded with fluid under pressure, as in the case of the bearings 2, 7 and 102, 107 of FIGS. 1 and 2 respectively, but the leading bearing 202 also locates the rotor 201 axially. The pressure fluid is introduced into the stationary wall 215 of the flowmeter by way of an inlet port 22 and is distributed to the bearings 202, 207 by an internal duct 21. A ring of teeth 223 is secured around the crests of the rotor blades 204, the teeth passing through the gap between the poles 25, 26 of a pick-up magnet embedded in an insert 33 sealed into the wall 215.

We claim:

1. A rotary flowmeter comprising a stator; a rotor adapted to revolve coaxially with said stator; propeller blades mounted around a periphery of said rotor; complementary circumferential rib and groove bearing formations, the one on the stator and the other on the rotor, which are interengageable with working clearance and each of which has two bearing surfaces which taper in opposite axial directions; a plurality of recesses opening through the bearing surfaces of the bearing formation on the stator into said working clearance space and disposed around the axis of rotation of said rotor; and an individual restricted pressure fluid connection to each of said recesses.

2. A rotary flowmeter comprising a stator; a rotor adapted to revolve coaxially with said stator; propeller blades mounted around a periphery of said rotor; complementary circumferential rib and groove bearing formations, the one on the stator and the other on the rotor, which are interengageable with working clearance and each of which has two bearing surfaces which taper in opposite axial directions; a plurality of pairs of opposed recesses opening through the opposite bearing surfaces of the bearing formation on the stator and disposed around the axis of rotation of said rotor; and an individual restricted pressure fluid connection to each of said recesses.

3. A rotary flowmeter comprising a cylindrical stator; an annular rotor adapted to revolve coaxially with said stator; propeller blades mounted around a periphery of said rotor; a bearing groove in said stator symmetrical about a plane radial to the axis of rotation of the rotor and open towards said axis, the bearing groove having two bearing surfaces which taper in opposite axial directions; a complementarily shaped bearing rib on said rotor interengageable, with working clearance, in said bearing groove; a plurality of recesses disposed at equiangular intervals around each bearing surface of said bearing groove, each recess in one surface being opposite a corresponding recess in the other surface; and an individual restricted pressure fluid connection to each of said recesses.

4. A rotary flowmeter comprising a stator; a rotor adapted to revolve coaxially with said stator; propeller blades mounted around a periphery of said rotor; a bearing groove in said rotor symmetrical about a plane radial to the axis of rotation of the rotor and open towards said axis, the bearing groove having two bearing surfaces which taper in opposite directions; a complementarily shaped bearing rib on the stator adapted to engage, with working clearance, in said bearing groove; pairs of opposed recesses opening through the bearing surfaces of said rib and equiangularly spaced around the axis of rotation of the rotor; and a constricted pressure fluid connection to each recess.

5. A rotary flowmeter comprising a hollow stator adapted to form part of a fluid flow circuit and having an internal surface shaped to present a venturi throat; an annular rotor mounted in said throat for rotation about the venturi axis; propeller blades mounted around the inner periphery of said rotor; a V-shaped bearing groove in the stator around said throat; a complementarily shaped bearing rib on the outer periphery of said annular rotor and adapted to lie with working clearance in said bearing groove; a plurality of recesses spaced equiangularly around each wall of said bearing groove; and a constricted pressure fluid connection to each recess.

6. A rotary flowmeter according to claim 5 wherein a fixed streamlined core is located coaxially within said throat with working clearance from the inward-facing edges of said propeller blades.

7. A rotary flowmeter comprising a hollow stator having an annular throat section and separate annular flow control sections adapted to bear against the side walls of said throat section, the inner periphery of each of said flow control sections being shaped to define a venturi; a substantially V-shaped bearing groove around the inner periphery of said throat section; recesses spaced equiangularly around each side wall of said groove; a constricted pressure fluid duct connecting each recess to a common pressure fluid inlet; an annular rotor located coaxially within said throat section; propeller blades around the inner periphery of said annular rotor; a bearing rib of complementary shape to said bearing groove on the outer periphery of said annular rotor and adapted to lie with working clearance within said groove; and a streamlined core rigidly mounted within said stator and having a working clearance from the inner edges of said propeller blades.

8. A rotary flowmeter comprising a stator; a rotor adapted to revolve coaxially with said stator; propeller blades mounted around a periphery of said rotor; complementary circumferential rib and groove bearing formations, the one on the stator and the other on the rotor, which are interengageable with working clearance and each of which has two bearing surfaces which taper in opposite axial directions; magnetic means for detecting rotation of said rotor comprising a plurality of magnetic armature elements carried by one of the bearing formations and a coacting magnet core carried by the other bearing formation; a plurality of recesses opening through the bearing surfaces of the bearing formation on the stator into said working clearance space and equiangularly disposed around the axis of rotation of said rotor; and an individual restricted pressure fluid connection to each of said recesses.

9. A rotary flowmeter comprising a cylindrical stator; an annular rotor adapted to revolve coaxially with said stator; propeller blades mounted around a periphery of said rotor; a bearing groove in said stator symmetrical about a plane radial to the axis of rotation of the rotor and open towards said axis, the bearing groove having two bearing surfaces which taper in opposite axial directions; a complementarily shaped bearing rib on said rotor interengageable, with working clearance, in said groove; a pick-up magnet in said stator with its poles embracing said bearing groove; a plurality of coacting magnetic armature elements in said bearing rib on said rotor; a pick-up coil wound on said magnet core; a plurality of recesses disposed at equiangular intervals around each bearing surface of said bearing groove, each recess in one surface being opposite a corresponding recess in the other surface; and an individual restricted pressure fluid connection to each of said recesses.

10. A rotary flowmeter comprising an axial stator spigot; a generally V-shaped bearing rib around said stator; a hollow rotor embracing said rib with working clearance and having a bearing groove of complementary shape to said rib; recesses spaced equiangularly around each flank wall of said rib; restricted pressure fluid connections to said recesses; a magnet core projecting radially into said bearing rib with its poles on opposite sides of the ridge of the V shape; armature elements fixed in said bearing groove in said rotor so as to project into the gap between said poles; and propeller blades around the outer periphery of said rotor.

11. A rotary flowmeter having a fixed stator structure comprising an outer tubular wall adapted to be connected to a fluid flow circuit and coaxial upstream and downstream stator bearings rigidly mounted within said tubular wall; a rotor having radial propeller blades around its outer periphery; upstream and downstream journals projecting axially from said rotor into said stator bearings, at least said upstream stator bearing having an annular V-shaped groove around its inner wall and said upstream rotor journal having a complementarily shaped ridge adapted to fit with working clearance within said groove; recesses spaced equiangularly around the flank walls of said groove; and restricted pressure fluid connections to said recesses.

12. A rotary flowmeter according to claim 11 wherein a ring of magnetic armature elements is carried on the tips of said rotor propeller blades and a magnet core is embedded in said tubular stator wall with its poles spaced in the axial direction so that said armature elements can pass between the poles, and a pick-up coil is wound on said magnet core.

13. A rotary flowmeter according to claim 11 wherein each stator bearing is carried on a spider having streamlined radial arms secured to the internal surface of the tubular stator wall, at least one arm of each spider having a radial bore connected to a pressure fluid inlet in said tubular wall and to the bearing surfaces.

References Cited in the file of this patent

UNITED STATES PATENTS

| | | |
|---|---|---|
| 1,337,742 | Abbott | Apr. 20, 1921 |
| 2,136,756 | Rockall et al. | Nov. 15, 1938 |
| 2,597,371 | Perkins | May 20, 1952 |
| 2,709,366 | Potter | May 31, 1955 |
| 3,015,524 | Slayter | Jan. 2, 1962 |